Dec. 25, 1923.
S. FERENCY
1,478,896
COMBINED NOTE HOLDER AND CAP REMOVER FOR BOTTLES
Filed Dec. 10, 1921
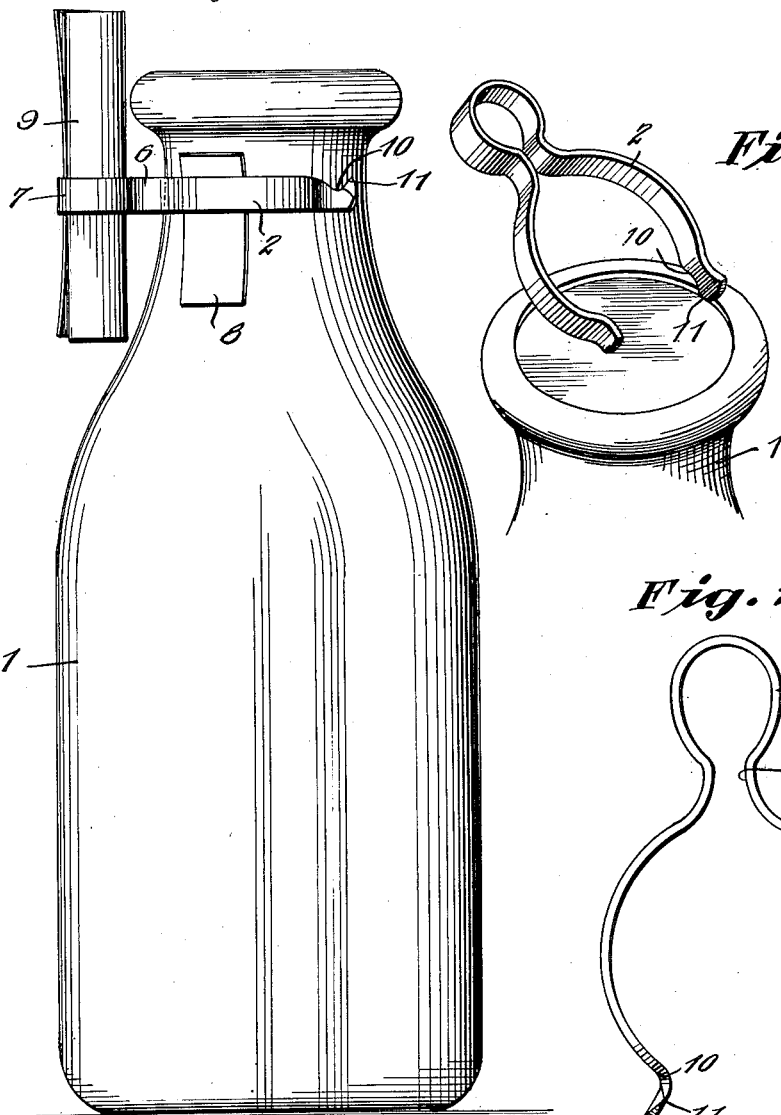
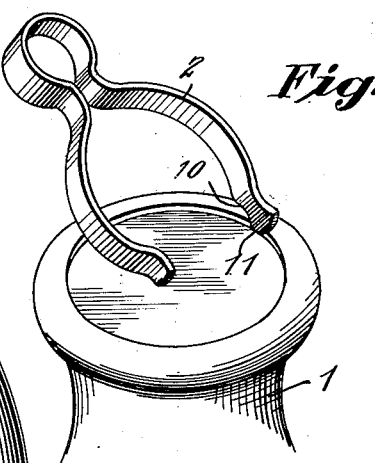
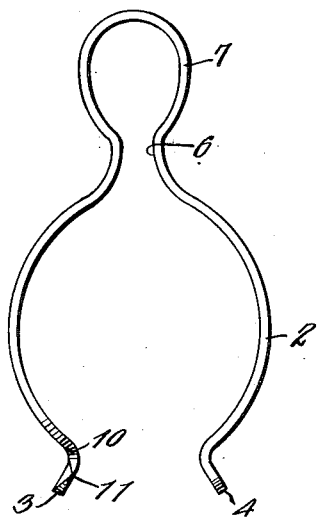
Inventor
Steve Ferency
By Buam + Thomas
Attorney Patented Dec. 25, 1923.

1,478,896

UNITED STATES PATENT OFFICE.

STEVE FERENCY, OF CANTON, OHIO.

COMBINED NOTE HOLDER AND CAP REMOVER FOR BOTTLES.

Application filed December 10, 1921. Serial No. 521,505.

*To all whom it may concern:*

Be it known that I, STEVE FERENCY, a subject of the Emperor of Hungary, residing at Canton, in the county of Stark and State of Ohio, have invented certain new and useful Improvements in Combined Note Holders and Cap Removers for Bottles, of which the following is a specification.

The invention relates to improvements in a combined ticket holder and cap remover adapted particularly for use in connection with milk bottles.

It has generally been the practice for housewives to place a note in the interior of a milk bottle when it is desired that the milkman leave different or increased quantities of milk. Also in certain communities a milk ticket must be left with a bottle before the milkman will leave milk and such tickets have also usually been placed within the bottle.

Such notes subject the milkman to much trouble to remove them from the bottle with a consequent loss of time, and furthermore the notes frequently drop within the bottle so that the same are rendered highly unsanitary in view of the fact that the notes are often not removed during the washing of the bottle.

It is an object of the present invention to provide a detachable holder adapted to be applied to any size bottle and constructed to support a milk ticket and a note, and also fashioned whereby the holder forms a convenient implement for removing the usual paper cap or cork from a milk bottle.

With the foregoing conception in mind, the invention primarily comprises a resilient clip or holder made of a single piece of material and fashioned to fit around the neck of a bottle, the same being formed to receive the necessary tickets and having a sharpened or pointed end portion by which the cap is removed. When the clip is applied to an empty bottle containing the proper notes or tickets, the milkman removes the tickets, receives the proper instructions and then takes the clip and applies it to a filled bottle of milk. The housewife then has the clip around the filled milk bottle and can freely remove the cork or cap by disengaging the clip from the bottle and using the pointed end thereof for withdrawnig the cork.

In the accompanying drawings I have shown a preferred embodiment of my invention, but such showing is only for the purpose of illustration, and many changes may be made without departing from the spirit of the invention.

In the drawings, Figure 1 represents a side elevation of the holder in use applied to the neck of a bottle. Figure 2 is a top plan view of the holder; and, Figure 3 is a perspective view of holder illustrating its use as a stopper remover.

Referring now more particularly to the drawings, wherein like reference characters indicate corresponding parts, the numeral 1 designates the usual milk bottle having the conventional neck portion.

My invention comprises a combined ticket holder and cork remover 2, the same being formed of any desired resilient material which is preferably rust-proof and having rebent complemental side portions 3 and 4, the outer portions of said sides being curved to embrace the surfaces of a bottle with a reduced inner portion 6, and a loop part 7. By so constructing the clip the same is freely yieldable and can be slipped over various sized bottles. The milk tickets which are left in payment of a bottle of milk, are preferably placed between the resilient sides of the clip and the bottle, as indicated by the reference character 8, while a note may be deposited within the resilient loop 7, as shown by the character 9 which note may inform the milkman as to the kind and quantity of milk desired.

The outer end of one or both sides of the clip is provided with a cutout portion 10, the same forming a pointed end 11 which constitutes a means for removing the cap or cork of the bottle. This pointed end engages the bottle near the edge thereof and the sharpened portion penetrates the cork or the like so that the same can be freely lifted from the bottle.

When my device is in use the housewife places the clip around an empty bottle, inserting a milk ticket for a bottle of milk, and also a note in the loop if different quantities and kinds of milk are desired. The milkman upon arriving can freely remove the ticket and the note, eliminating the necessity of pounding the bottle for the purpose of getting out tickets which are placed within the interior of the bottle under the present day practices, complies with the request of the housewife and then slips the clip from the empty bottle to be placed upon the milk bottle he has left. The housewife receives the filled milk bottle with the clip, and manifestly the clip can be freely removed from the bottle and the pointed end 11 employed for the purpose of ejecting the cap or stopper as shown in Figure 3 of the drawing eliminating the use of an independent instrument for this work.

The invention manifestly is one which may be altered in many particulars, particularly with regard to the material of which the clip is composed, its formation, etc., but I wish it to be understood that my invention broadly comprehends a resilient clip which is constructed to act as a ticket holder and also provide means for removing the bottle cap.

Having thus described my invention, what I claim is:

A clip of the character described composed of a single strip of flat spring metal, said strip being bent midway of its ends forming sections of substantially equal length and curved at the bend thereof to provide a relatively small loop near said bend end with a contracted resilient neck portion at the entrance to said loop to close said loop, said strip sections from the contracted neck loop being curved outwardly and then inwardly to form a spring clip of a cross section adapted to detachably engage the neck of a bottle and adhere thereto through the resiliency of the metal sections of said strip, the extremities of each section being formed to offer finger gripping surfaces by which the neck engaging portions of each section can be spread apart to disengage the clip.

In testimony whereof I affix my signature.

STEVE FERENCY.